Patented Sept. 12, 1944

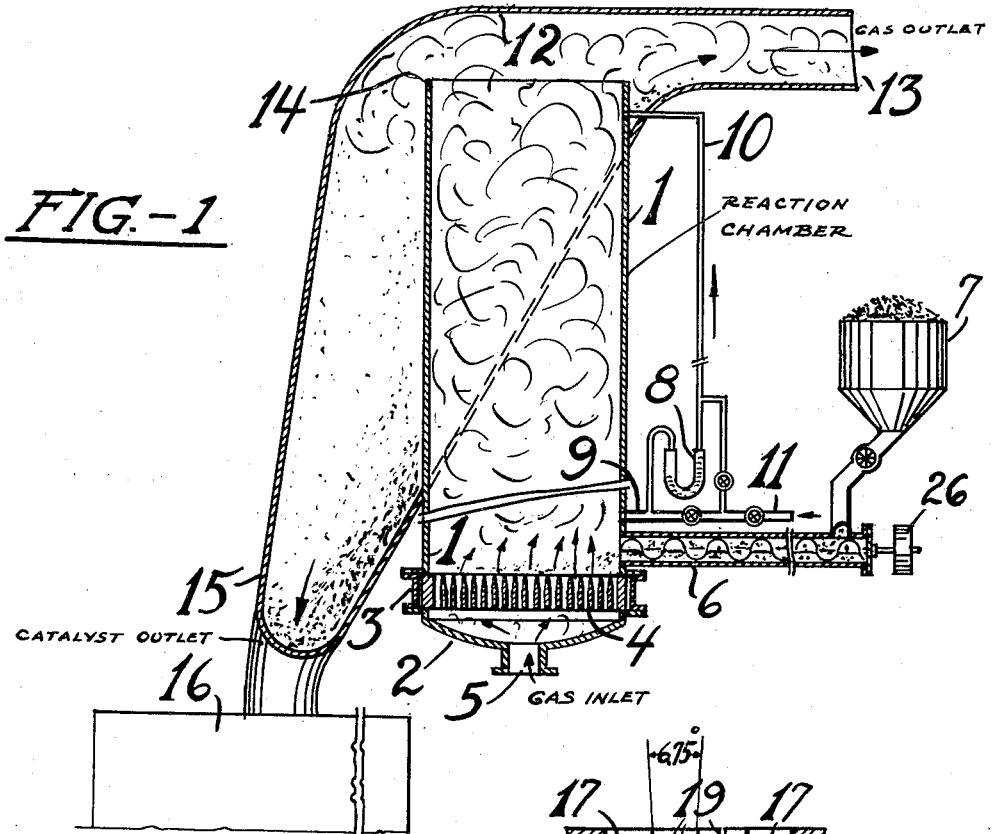
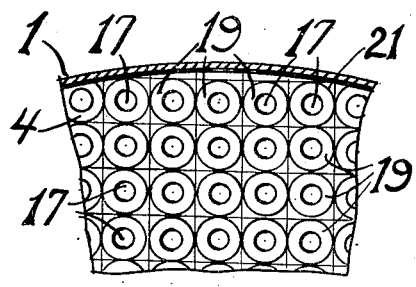
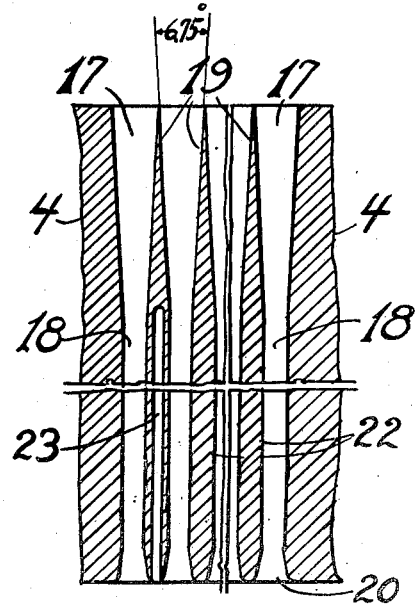

2,357,901

UNITED STATES PATENT OFFICE 2,357,901

REACTION CHAMBER

Warren K. Lewis, Newton, and Edwin R. Gilliland, Cambridge, Mass., assignors to Standard Oil Development Company, a corporation of Delaware Application October 1, 1940, Serial No. 359,202

8 Claims. (Cl. 34—57)

This invention relates to vessels adapted to provide contact between gaseous fluids and solid materials and pertains more particularly to a reaction chamber in which a gaseous fluid passes upwardly in contact with particles of solid material which are suspended in the fluid in a mobile state.

It has long been recognized that if a gas be made to flow upwardly through a bed of granular, finely divided solid particles, the bed is converted into a kind of quicksand with the surface of the solid mass having the appearance of a boiling liquid, i. e., the lifting effect of the rising gas imparts to it a high degree of mobility making it resemble a liquid to such an extent that the analogy between it and the liquid state has been heavily stressed (see Martin, Chemical Engineering, 1928, Crosby, Lockwood & Sons, London, section 31, Page 1, et seq.). The maintenance of this condition of mobility in a bed of solid granules offers excellent conditions for interaction of a gas with a solid as it provides the advantages of (1) an enormous surface of contact between solids and gases per unit volume of reaction vessel, (2) a correspondingly large reaction capacity per unit volume of reactor, (3) the dampening effect on any heat liberated or absorbed by the reaction of the high heat capacity of the suspended particles minimizing any temperature changes that would otherwise occur. In operations in which it is desired to maintain the solid material in the reaction vessel for a long time, as in catalytic reactions characterized by a long period of catalyst life, the particles of catalyst are preferably of uniform size and the gas is passed through the catalyst bed at only a sufficiently high velocity to give it the motion and appearance of a boiling liquid, but without carrying any substantial portion of the catalyst overhead out of the chamber. The operation may also be conducted at much higher gas velocities at which the solid material is carried out of the reaction vessel in a short time, in which case additional solid material is preferably supplied at a sufficiently high rate to compensate for that leaving the chamber and to maintain a high concentration of solid material in the reaction chamber, as described in our co-pending application Serial No. 312,200, filed January 3, 1940.

It has been observed that in passing a gas upwardly through a mass of finely divided particles at such a rate as to maintain the particles in a mobile state, the concentration of solids can be held high at suitably moderate gas velocities, but that by increasing the gas velocity a few fold the solids are completely entrained and are carried quickly out of the treating zone. In other words, suitable treating conditions can be maintained with no complication in the approach channels by contracting the section of the treating zone at its bottom to about ¼ or ⅓ of its area and introducing the gas through this restricted section. Solids will penetrate down into such a section, but will promptly be kicked up. The depth of penetration depends on the degree of constriction and to a lesser extent on the concentration of solids in the treating zone. Constriction to ¼ of the area may require a constricted portion 20 to 70 diameters in length to reach a point where no solids penetrate, but a further constriction greatly reduces this penetration. For example, constriction to $\frac{1}{15}$ or $\frac{1}{20}$ of the area of the treating zone, as may be done conveniently with a number of parallel tubes supplying the treating zone, reduces the penetration of solids under ordinary operating conditions to as low as 1 to 4 diameter of such tubes, thereby greatly reducing the length of the supply tubes necessary to prevent the solids from falling out of the treating zone. The constriction should be gradual as otherwise there will be dead spaces in the treating zone where accumulation of solids will occur. Venturi expander sections have been found satisfactory and it is desirable to keep the angle of divergence below about 7°. With larger angles, solids may accumulate even on the sides of the expander section itself.

Since a treating vessel of reasonable dimensions having a single expander section below it would be inordinately long, a grid such as described below is preferable for the reactor bottom. It has also been observed that the finely divided solid particles have a tendency to settle out in any relatively quiescent zones at the bottom of the reaction chamber and that channels or chimneys are thereby produced up through the mass, the efficiency of contact of solids and gas being thus greatly reduced. Hence it is also desirable for the upper surface of the grid to have substantially no flat space, and for the upper edges of the openings in the grid to be substantially contiguous.

An object of this invention is thus to provide an improved type of reaction chamber which permits extremely effective contact of solids and gas in the type of operations described above and in which the settling out of solid material during operation is prevented. Another object of this invention is to provide an improved reaction chamber suitable for use in the types of processes described above which affords improved methods for supply of solid material and gas thereto and for indicating and controlling the concentration of solid material therein. Another object of this invention is to provide an improved means for supplying a gas to the lower portion of a treating zone containing solid material suspended therein in the gas.

Other and further objects of this invention will be apparent from the following description and the claims.

Referring to the drawing, Fig. 1 is a diagrammatic illustration in sectional elevation of a reaction chamber constructed according to the present invention. Fig. 2 is an enlarged illustration in sectional elevation of the gas supply plate of Fig. 1. Fig. 3 illustrates a view from above of the section of the gas distributor plate illustrated in Fig. 2.

Referring to Fig. 1, a vessel adapted for contact of gases with finely divided solid materials is provided with a side wall 1 connected to a bottom section 2 by flange connections with a spacing element 3 which permits the sections 1 and 2 of the vessel shell to be drawn into gas-tight contact with a gas distributor plate 4. A connection for supply of gas below the distributor plate 4 is provided at 5 and any suitable means for supply of catalyst to the vessel 1, preferably at a point above the distributor plate 4 is provided, such as a screw conveyor 6 having a driven means such as the pulley or gear 26 and a catalyst supply means such as the hopper 7.

The amount of solid material in the treating zone may be determined by suitable means such as by measuring the difference in pressure existing between upper and lower portions of the treating zone during operation. This may be done as illustrated by a manometer or other pressure differential indicator 8 connected on the higher pressure side through a pipe 9 to the lower portion of the treating zone and on the lower pressure side through a pipe 10 to the upper portion of the treating zone. The plugging of pipes 9 and 10 by solid material may be prevented by passing a suitable reagent or inert gas preferably at a slow, uniform rate through lines 9 and 10 from line 11.

If it is desired to conduct the treatment in a closed vessel and/or to provide means for recovery of any solid materials carried out of the vessel, it may be provided with a top 12 and a gas outlet 13. This top 12 may extend beyond the side walls 1 to provide an enlarged zone 14 which serves to reduce the upward velocity of the vapors and to permit separation of catalysts therefrom. Catalyst withdrawal means 15 connect the top 12 with any suitable means for receiving the separated catalyst such as the hopper 16.

Turning to Figs. 2 and 3, the gas distributor plate 4 is provided with a number of openings 17, each of which is in the form of a cylinder 18 which connects at its upper end with a "venturi-like" expanded section 19, the side walls of which diverge at a total angle of preferably about 7° or less. This flared section above the cylindrical openings changes in a smooth curve from a circle, at the top of the cylinder, to a square at the upper surface of the distributor plate 4. The bottom sections 20 of the tubes may be similarly constructed, with the total angle between the converging sides being about 25° or less, or they may be of any rounded, streamline design, in order to reduce the pressure drop through the tubes as much as possible. Each side of each flared or expanded section 19 is preferably contiguous with a side of an adjacent expanded section or with the inner surface of the side wall 1 of the reaction chamber thereby leaving no flat surface on the top of the gas distributor plate 4. The flared upper portion of the openings 19 which are adjacent the edge of the plate, such as the flared portion 21, illustrated in Fig. 3, may be constructed to provide a flared section extending from the top of the cylindrical portion of the opening upwardly and outwardly to the wall 1 at the top of the plate 4. However, a substantial improvement in operation over the ordinary type of perforated plate will be secured even if this refinement in the design of the gas distributor plate is omitted and small flat areas are left wherever necessary around the edge of the plate 4 where the edges of the flared sections 19 do not exactly conform with the shape of the vessel.

The gas distributor plate 4 may be constructed in any suitable manner and the openings 17, 18 and 20 may be formed in an otherwise solid plate as by casting or suitable machining operations. In this case, portions of the section 22, between the openings 17, may be cut out from below in order to save material and weight, as shown at 23 in Fig. 2. Also, the gas distributor plate 4 may be built up by joining along their upper edges a plurality of separately formed units with any additional provisions for bracing as may be desirable for purpose of strength and rigidity.

While the gas distributor plate 4 has been described above in connection with the illustration of a preferred embodiment, it will be understood that the invention is not restricted to this particular form. The cylindrical portion 18 may be constructed in any other narrow elongated form which serves to provide a substantial restriction in area relative to the total area of a horizontal section of the reaction vessel and thereby increases the gas velocity passing through this section sufficiently to completely entrain any solid material therein and to prevent it from falling below the plate. The thickness of the plate 4 and hence the height of the tubes 18 depends primarily on the ratio of the total cross sectional area of the treating zone to the total minimum cross sectional area of the tubes 18. A ratio of at least 5 should be used with the openings uniformly distributed over the surface of the plate 4, and a ratio of at least 10 is preferred. Reduction of the total cross sectional area of the tubes 18 increases the gas velocity through them, and it is this increase which reduces penetration. The greater the ratio of the cross section of the treating zone to the total cross section of the openings 18, the shorter need be the length of openings 18 to prevent penetration. For example, a ratio of about 15 or 20 permits tube lengths of about 1 to 4 diameters. The diameter of each individual opening 20 is preferably substantially greater than the maximum diameter of the solid particles supplied to the reaction zone in order to avoid the possibility of the single particles becoming jammed in the openings. The upper bared section is designed to permit a reduction in the gas velocity to that existing in the treating zone while avoiding any substantially flat area in the bottom of this zone. The upper edges of the adjacent flared openings are thus made contiguous and the top of these openings may be of any suitable polygonal form permitting this. While regular polygons are preferred, such as triangles, squares, hexagons or suitable combinations of such forms, irregular forms may be used if desired. The flared portions of the opening will thus be, especially at their upper portions of an inverted pyramidal form.

A suitable method for using an improved reaction chamber constructed according to this invention, in the catalytic cracking of hydrocarbon oils to produce motor fuels of improved antiknocking characteristics, will now be described, it being understood that this description is presented solely for purpose of illustration and the present invention is not limited to the use of the improved apparatus in this process.

Referring to Fig. 1 the oil to be cracked is introduced in vapor form and with or without other diluent gases such as steam, hydrogen, etc., into the vessel I through line 5. Prior to introduction the oil is preheated to the required cracking temperature and steam, hydrogen or other diluent may be added to aid in vaporization and/or to improve the catalytic process. The oil used may be any hydrocarbon oil capable of vaporization without substantial coking and may be either synthetically prepared as by reaction of carbon monoxide and hydrogen or by liquefaction or destructive hydrogenation of carbonaceous materials or it may be of natural origin such as petroleum oil fractions and products obtained from mineral oils by cracking, solvent extraction, destructive hydrogenation and combinations of such treatments. Petroleum gas oil and heavy naphtha fractions are examples of suitable feed stocks.

The oil vapors with diluents if present are preheated to the desired reaction temperature such as for example from 600° F. to 1200° F. and are introduced through line 5 and pass upwardly through the openings in the plate 4 into the reaction zone at a velocity sufficient to carry overhead in a short time substantially all of any catalyst particles present in the reaction chamber.

A suitable cracking catalyst is supplied continuously to the reaction vessel by any suitable means, such as the screw conveyor 5. The catalyst may also be introduced into a separate stream of reagent and/or diluent gases and forced into the reaction vessel. This catalyst may be any of the known solid materials capable of effecting the desired conversion, such as the active or activated clays or synthetic catalysts, such as the synthetic absorbent gels consisting principally of silica, alumina, magnesia, or of mixtures of such materials. The catalyst may be in powdered, granular or molded form and is preferably in the form of particles of very small size. While catalyst particles as large as 10 mesh or larger may be used, much smaller sizes are preferred and the catalyst is preferably ground to a fine powder having a particle size from 200 to 400 standard mesh or even finer. The catalyst is preferably preheated substantially to the reaction temperature before it is passed into the reaction zone.

The rate of supply of catalyst and vapors or gases to the reaction vessel may be adjusted to provide any desired concentration and time of contact of catalyst and reagents, the only condition required being that the velocity upwards of gases or vapors through the openings in the gas distributor plate 4 be sufficient to prevent solids from falling through these openings, as described above. When it is desired to maintain a high concentration of solid catalyst in the reaction zone, the rate of supply of gases or vapors and catalyst may be adjusted as described in our copending application Serial No. 312,200, filed January 3, 1940, to maintain a concentration of at least about 3% by volume of catalyst in the reaction zone. This concentration may be readily determined by measuring the pressure drop between the bottom and top of the reaction zone by the indicator means 8. This pressure drop will represent substantially the weight of catalyst in the reaction zone. While the dimensions of the reaction vessel may vary widely, the reaction zone should preferably be of sufficient height to provide a time of exposure of the oil vapor therein between about 1½ to 100 seconds. A number of reaction vessels may be used in series if it is desired to operate at high gas velocities and long times of contact which would require a single reactor of impracticable dimensions. The reaction vessel may be operated at any desired pressure suitable for cracking either subatmospheric or superatmospheric; pressures up to about 20 atmospheres or higher being preferred when using catalysts of small particle size of the order of 200 mesh or smaller in order to reduce the upward linear velocity of the oil vapors and to permit the use of reaction vessels of smaller size.

Under preferred conditions of operation the reaction vessel is maintained at a pressure between about atmospheric and 50 lbs. gauge and a reaction temperature is maintained at about 800° to 950° F. for maximum cracking to gasoline constituents or at a temperature of about 600° to 800° F. for conversion to aviation gasoline of optimum stability and antiknocking characteristics. The ratio of total catalyst to oil in the feed to the reaction zone will preferably be from about 1 to 6 parts by weight of catalyst per part of oil. The time of exposure of the oil in the reaction is preferably between about 10 and 50 seconds and of the catalyst is between about 15 seconds and 30 minutes, all conditions being interadjusted to secure about 20 to 80% conversion of the oil into gasoline constituents.

Any suitable means may be provided for withdrawing catalyst and vapors from the reaction zone and for separating the catalyst from the vapors withdrawn therewith. For example, in the apparatus illustrated, the reaction vesesl I is provided with an enlarged upper section surrounded by an annular casing which serves to reduce the upward velocity of the vapors and to permit separation of catalyst therefrom. The catalyst thus overflows into the annular space 14 and collects in the hopper 16 while the cracked vapors largely free of catalyst are drawn off through line 13. Provision for whirling the vapors in this zone to increase the catalyst separation may also be made, as by constructing the annular space 14 in the form of a cyclone separator. These vapors in line 13 are also preferably subjected to any suitable treatment for separation of catalyst therefrom, such as by passing through primary and secondary cyclone separators and/or electrostatic separators, maintained preferably at a sufficiently high temperature to avoid condensation of the vapors and are then passed to suitable condensing and fractionating equipment to separate the desired motor fuel fractions from any heavier fractions and tarry products. The total heavier fractions or any distillate fractions thereof may be heated and recycled preferably with additional fresh oil vapors to line 5 for further treatment.

The catalyst from the first or primary separators or from any other or all the separators may be returned to the reaction vessel by means 6 or it may be first subjected to suitable regeneration treatment if this should be found desirable, and then returned.

The improved treating vessel of this invention is also suitable for the regeneration of such catalysts. In this type of operation, the catalyst to be regenerated is supplied to the treating vessel by means 6 and a suitable regenerating gas, such as air or partially deoxygenated air or air diluted with flue gas or inert gases, is supplied through line 5.

The regeneration of the catalyst involves an exothermic reaction which tends to raise the temperature of the catalyst substantially, the amount of heat liberated depending upon the amount of carbonaceous material on the catalyst and the concentration and volume of oxygen in the oxidizing gas. It is preferred to have the oxygen content of the gas so low that the temperature of the catalyst does not rise sufficiently to decrease its activity. The maximum permissible temperature varies with different catalysts and in some cases may range up to about 1400° F. It is generally preferred to maintain a lower maximum temperature of the order of about 1000° F., particularly in the regeneration of synthetic catalysts. The extreme turbulence accompanying the operation in the apparatus of the present invention is particularly advantageous in providing a very uniform temperature level throughout the regenerating vessel and local overheating of the catalyst is thus avoided. Where the catalyst contains so much carbonaceous material that its combustion to gaseous products would raise the temperature of the catalyst and the oxidizing gases above the desired maximum temperature, a number of regeneration vessels may be used in series, preferably with cooling of the catalyst between regenerating vessels to a temperature of about 850° F. Additional cooling gases may also be supplied to the reaction vessel provided that the total amount of oxidizing and cooling gases does not require a vapor velocity above the maximum permissible to maintain the desired concentration of catalyst in the regenerating zone. Heat may also be withdrawn from the regenerating zone by placing therein heat exchanger surfaces such as cooling tubes through which water or steam or other fluid is circulated in liquid or vapor phase, or by recycling cooled catalyst.

While the apparatus has been described with particular reference to the catalytic cracking of hydrocarbon oils to which it is particularly adapted, it will be understood that in its broader aspect it will have a more general application such as for carrying out other types of high temperature hydrocarbon reactions such as reforming and other treatments of hydrocarbon vapors in the presence of hydrogen at ordinary atmospheric to high pressures of the order of 20 to 100 atmospheres or more with or without net consumption of hydrogen, also for desulfurization, alkylation, polymerization and other such treatments of hydrocarbons. The apparatus also has particular application to the coking of heavy oil vapors in the presence of a relatively inert adsorbent powder, such as pumice or spent clay. In such cases, the adsorbent material may have little if any catalytic activity but will serve as an adsorbent for the coke formed during the visbreaking or coking operation which coke may later be burned off from the inert material in a regenerating treatment such as described above.

The apparatus described herein may also be used for other processes involving interaction of a gas with a solid as in the conversion of coal into producer gas, the combustion of coal, the catalysis of various gas reactions by solid catalysts, the regeneration of such catalysts by treatment with gases and the like as pointed out above. The rate of supply of gas and solid material to the treating zone will be determined by the particular requirements of each process and the solid material may be supplied continuously while using a gas velocity sufficient to carry solids out of the reaction zone, in processes in which such operation is desired such as those in which the catalyst is effective for relatively short periods of time, or lower gas velocities sufficient only to maintain the solid material in a state of motion resembling a boiling liquid, without carrying appreciable amounts of the solid material out of the treating zone, as in processes in which the catalyst is effective for long periods of time or in which solid material is consumed or converted into gaseous products.

This application is a continuation in part of our copending application Serial No. 312,200, filed January 3, 1940, which is directed to a process for carrying out chemical reactions in which the apparatus described herein may be used.

Having thus described a specific embodiment of this invention, it will be understood that other modifications and variations come within the spirit and scope thereof. It will be also understood that it is not the intention to restrict the invention unnecessarily or to deduct any novel features thereof.

We claim:

1. In a vessel adapted for contact of a finely divided solid material with an upwardly moving gas in which said solid material is suspended in a mobile state, means for admission of said gas comprising an opening in the bottom surface thereof having sides converging downwardly at an angle of 7° until the opening is substantially reduced in sectional area and then extending downwardly in a substantially vertical direction.

2. In a vessel adapted for contact of a finely divided solid material with an upwardly moving gas in which said solid material is suspended in a mobile state, means for admission of said gas comprising a horizontally disposed plate having a plurality of openings in spaced relationship in the bottom surface thereof, each opening expanding in a smooth curve at its upper end into an inverted pyramidal section, the upper ends of said pyramidal sections being substantially contiguous.

3. In a vessel adapted for contact of a finely divided solid material with an upwardly moving gas in which said solid material is suspended in a mobile state, means for admission of said fluid comprising a horizontally disposed plate having a plurality of cylindrical openings extending partially therethrough, each cylinder expanding in a smooth curve at its upper end into an inverted pyramidal section, the upper ends of said pyramidal sections being substantially contiguous.

4. In a vessel adapted for contact of a finely divided solid material with an upwardly moving gas in which said solid material is suspended in a mobile state, means for admission of said gas comprising a horizontally disposed plate having a plurality of openings therethrough, each of said openings comprising a cylinder having a vertically disposed axis and having a length substantially greater than its diameter, the upper end connecting with an expanding section, the sides thereof having a maximum inclination to said axis of about 3.5°, the said expanding section changing progressively upward in a smooth curve from a circular section at the bottom thereof to a square section at the top which lies in the upper surface of said plate, the edges of adjacent square sections being substantially contiguous whereby substantially no flat surface is provided on the top of said plate.

5. In a vessel adapted for contact of a finely divided solid material with an upwardly moving gas in which said solid material is suspended in a mobile state, means for admission of said gas comprising a horizontally disposed plate having a plurality of openings in the upper surface thereof, the edges of adjacent openings being contiguous whereby said surface consists substantially only of the said edges and possesses substantially no flat upper surface, each of said openings having sides converging downwardly at an angle of about 7° until the opening is substantially reduced in sectional area, and then extending downwardly in a substantially vertical direction for a distance equal to at least the maximum width of the remaining opening between said substantially vertical sides.

6. In a vessel adapted for contact of a finely divided solid material with an upwardly moving gas in which said solid material is suspended in a mobile state, means for admission of said gas comprising a horizontally disposed plate having a plurality of openings therethrough substantially uniformly distributed over the surface of the plate and varying in cross-sectional area from one side of the plate to the other, the total minimum cross sectional area of the holes being not greater than one-fifth the total area of cross section of the plate.

7. In a vessel adapted for contact of a finely divided solid material with an upwardly moving gas in which said solid material is suspended in a mobile state, means for admission of said gas comprising a horizontally disposed plate having a plurality of openings therethrough substantially uniformly distributed over the surface of the plate and varying in cross-sectional area from one side of the plate to the other, the total minimum cross sectional area of the holes being not greater than one-tenth the total area of cross section of the plate.

8. In a vessel adapted for contact of a finely divided solid material with an upwardly moving gas in which said solid material is suspended in a mobile state, an improved means for admission of said gas comprising a horizontally disposed plate having a plurality of openings therethrough substantially uniformly distributed over the surface of the plate and varying in cross-sectional area from one side of the plate to the other, the total minimum cross sectional area of the holes being not greater than one-tenth the total area of cross section of the plate, the diameter of each individual opening being substantially greater than the maximum diameter of the solid particles.

WARREN K. LEWIS.
EDWIN R. GILLILAND.